United States Patent [19]

Zaydel

[11] 4,186,645

[45] Feb. 5, 1980

[54] PLASTIC PLUG, NUT AND STUD FASTENER ASSEMBLY

[75] Inventor: Wieslaw S. Zaydel, Rochester, Mich.

[73] Assignee: General Motors Corporation, Detroit, Mich.

[21] Appl. No.: 856,644

[22] Filed: Dec. 2, 1977

[51] Int. Cl.² ............................................. F16B 13/04
[52] U.S. Cl. .......................................... 85/83; 85/35; 85/36; 151/41.74
[58] Field of Search .......... 85/80, 81, 82, 83, DIG. 2, 85/5 R, 32 R, 35, 36; 151/14.5, 41.74; 151/7

[56] References Cited

U.S. PATENT DOCUMENTS

| | | | |
|---|---|---|---|
| 462,318 | 11/1891 | Loehner | 151/14.5 |
| 1,409,758 | 3/1922 | Nichols | 85/32 R |
| 2,397,076 | 3/1946 | Keller et al. | 78/46 |
| 2,479,683 | 8/1949 | Hufferd | 85/32 R X |
| 2,894,426 | 7/1959 | Rapata | 85/36 |
| 3,139,786 | 7/1964 | Ardell | 85/7 |
| 3,200,694 | 8/1965 | Rapata et al. | 85/82 |
| 3,205,760 | 9/1965 | Seckerson et al. | 85/82 |
| 3,362,280 | 1/1968 | Muller | 85/35 |
| 3,887,990 | 6/1975 | Wilson | 85/36 X |

FOREIGN PATENT DOCUMENTS

| | | | |
|---|---|---|---|
| 2452398 | 5/1976 | Fed. Rep. of Germany | 85/83 |
| 929923 | 6/1963 | United Kingdom | 85/32 R |
| 996455 | 6/1965 | United Kingdom | 85/80 |

Primary Examiner—Rodney H. Bonck
Attorney, Agent, or Firm—Arthur N. Krein

[57] ABSTRACT

A fastener assembly for securing a first member to an apertured second member which includes a stud fixed to the first member with the stud shank extending therefrom having a series of spaced apart annular retention grooves thereon, a stud retainer in the form of a plastic plug assembled into the aperture of the second member, the stud retainer having a socket cavity extending from one side to receive the stud shank in an interference fit therewith, and a nut threaded onto the stud retainer causing the material thereof to flow radially inward into the annular grooves of the stud shank whereby to entrap the stud shank in the stud retainer.

2 Claims, 4 Drawing Figures

PLASTIC PLUG, NUT AND STUD FASTENER ASSEMBLY

This invention relates to fastener assemblies and, in particular, to a stud and plastic plug like stud retainer that is adapted to be locked to the stud by a nut threaded onto the stud retainer.

FIELD OF THE INVENTION

In certain present day automotive vehicle body assemblies, for example, a rear quarter panel extension, made of a suitable plastic material, is secured to the body, sheet metal, rear quarter panel by means of studs fixed to the panel extension in position so as to extend through apertures provided in the quarter panel to be secured thereto by thread cutting nuts threaded onto the free end of the studs. It has now been found that these nuts, when torqued down on the studs, transmit loads to the plastic extensions such that, when the body with the extensions thereon is painted and then goes through a paint oven, the difference in coefficient of expansion between the plastic material of the extension and the metal of the quarter causes the plastic extension to distort and crack.

SUMMARY OF THE INVENTION

The present invention provides a positive fastener assembly for use, for example, on an automotive vehicle body whereby a plastic quarter panel extension can be attached to a sheet metal quarter panel by means of studs on the extension inserted into plastic stud retainers pre-assembled into apertures in the quarter panel, prior to painting of these elements. After the body has gone through a paint oven, a nut is threaded onto each of the stud retainers which forces the plastic material of the stud retainer to flow radially inward into annular grooves provided on the studs thereby entrapping the stud in the plastic stud retainer.

It is therefore the primary object of this invention to provide an improved fastener assembly whereby to secure two members together by means of a stud fixed to one member and by a deformable stud retainer fixed to the other member, a nut then being used to effect positive attachment of the stud to the stud retainer.

Another object of this invention is to provide an improved fastener assembly for providing positive attachment of a plastic member to a metal member without transmitting high loads to the plastic member.

For a better understanding of the invention as well as other objects and further features thereof, reference is had to the following description of the invention to be read in connection with the accompanying drawings.

DESCRIPTION OF THE PREFERRED EMBODIMENT

Figure 1:
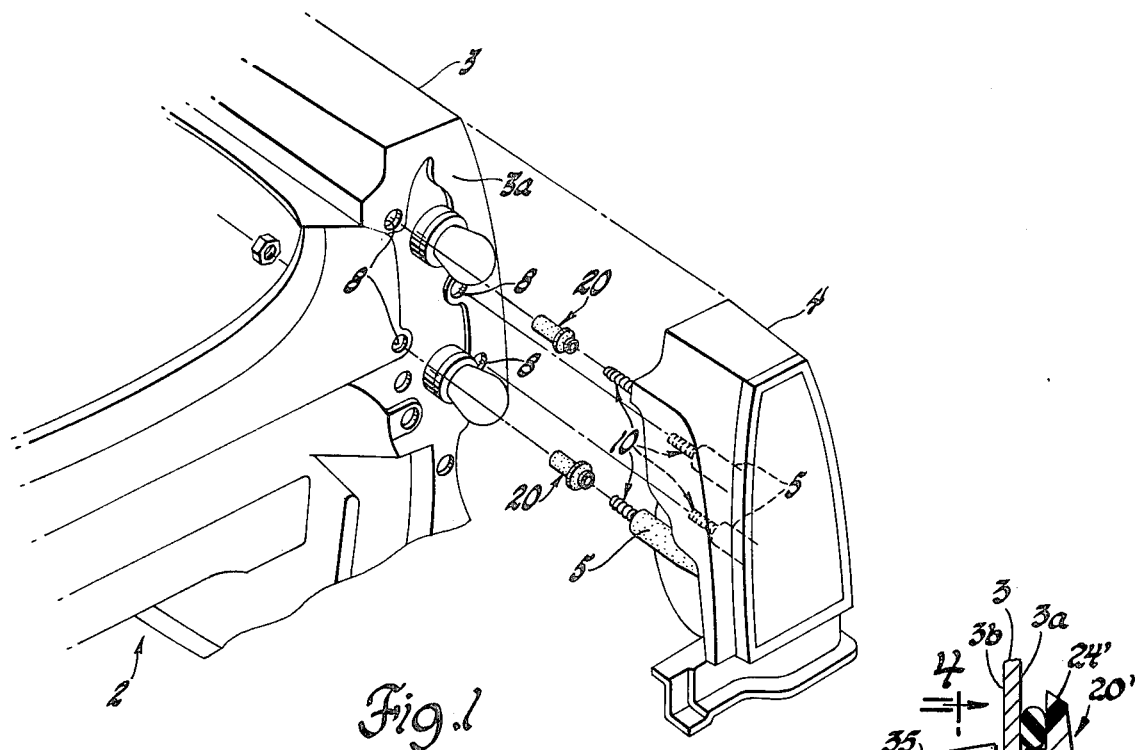
FIG. 1 is an exploded perspective view of the right rear end of a vehicle body having a plastic, quarter panel extension that is attachable to a sheet metal, quarter panel by means of a plastic plug like stud retainer, nut and stud fastener assembly in accordance with the invention.

Referring first to FIG. 1, there is shown, for purpose of illustration only, a portion of a vehicle body assembly having incorporated therein a plastic plug, nut and stud fastener assembly in accordance with the invention. As shown, the vehicle body 2, only the right rear portion of which is illustrated, includes a first member or sheet metal, rear quarter panel 3 and a second member or right quarter panel extension 4, made of a suitable plastic elastomer material, which when secured to the quarter panel 3, in a manner to be described, forms an extension thereof, as its name implies.

In the construction illustrated, the quarter panel extension 4 is provided with a plurality of spaced apart bosses 5 formed integral therewith which extend outward from the inner body surface of the extension 4. Each of the bosses 5 has a fastener in the form of a stud 10 suitably fixed thereto, as by having the threaded shank end 11 of each stud threadedly received in a corresponding threaded aperture 6 in each boss, four such studs being used in the construction illustrated. Each stud 10 at its opposite end has a shank 12 that extends outward to be received in the socket of an associated stud retainer, generally designated 20, received in one of the apertures 8 provided for this purpose in the quarter panel 3 the stud retainer then being secured to the stud by a nut 40, in accordance with the invention, in a manner to be described.

Figure 2:
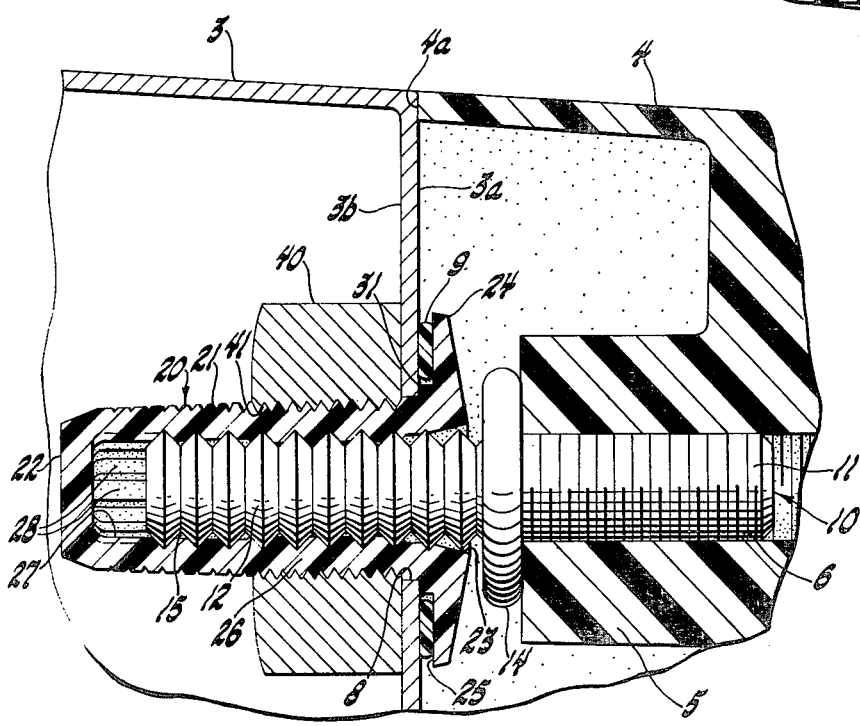
FIG. 2 is a sectional view of a portion of the completed assembly of the quarter panel extension to the quarter panel by a plastic plug, nut and stud fastener assembly of the invention.

Referring now to FIG. 2, the stud 10, in the construction illustrated, is provided with an integral, intermediate flange 14 separating the shank portions 11 and 12, the flange 14 being positioned to abut against the free end surface of a boss 5 when the shank 11 thereof is fully threaded into the threaded aperture 6 of that boss. Also in the construction illustrated, the shank 12, of a predetermined major outside diameter, is provided with a series or plurality of axially spaced apart annular retention grooves 15 thereon. From the side it will appear as if this shank portion 12 has annular corrugations with uniform peaks and valleys. It should be realized, however, that these peaks and valleys can be of any suitable shape, such as the so-called Christmas tree configuration, not shown, but well known in the fastener art, and that the depth of the grooves 15 need not be uniform throughout the length of the shank portion 12 of the stud, also in a manner well known in the fastener art.

The stud retainer 20, preferably made of a suitable plastic material, such as a thermoplastic polyester elastomer, may also be referred to as a push-on fastener of the snap-in or grommet type. In the embodiment illustrated, in FIG. 2 the stud retainer 20 comprises a tubular or crown portion 21 which is closed at one end by an end portion 22, the opposite end being open and providing an open throat 23. This opposite end of the crown portion 21 is provided with an annular bearing flange 24, having a flat bearing surface 25 which, when pressed into abutment with an outer bearing or end surface 3a of the quarter panel 3, or with a suitable sealant material 9 sandwiched therebetween, is at substantially at right angles to the axis of the crown portion 21, but which, in its as-molded form, is preferably inclined toward the closed end of the crown portion, a position not shown.

Crown portion 21 has an axially disposed, annular side wall 26, preferably of generally circular external configuration, defining a socket cavity or chamber 27 extending from the open throat 23 into which the shank 12 of a stud 10 may be inserted. The exterior of side wall 26 of the crown portion is preferably tapered and has an outside diameter next adjacent flange 24 that may be stepped, as shown, to provide a larger diameter boss 31, the dimensions of which are predetermined relative to the inside diameter of the apertures 8 in the quarter panel 3 so that the stud retainer can be frictionally retained therein. With this arrangement, if for some reason, an aperture 8 is oversize, the boss 31 will locate in the aperture, otherwise it will abut against the surface 3a, as shown.

As best seen in FIG. 2, a stud retainer 20 is assembled to the quarter panel 3 by inserting the closed end portion 22 of the crown portion 21 through an aperture 8 from the outer bearing surface 3a side of the quarter panel 3 and pushed through the aperture until the stud retainer becomes frictionally secured to the material of the quarter panel defining the aperture 8 into which it has been inserted.

The stud retainer 20, in the embodiment shown, is also provided with a plurality of circumferentially equally spaced apart gripping ribs or fins 28 that extend radially inward from the wall 26 to terminate at interior edges 30 which, in effect, define the limits of the minor internal diameter of the socket cavity 27. In the construction shown, the ribs or fins 28 merge at one end into the inner surface of end portion 22 and, at the other end, terminate next adjacent the open throat 23 to permit the throat wall to serve as a guide for entry of shank 12 of stud 10 into the socket cavity.

The minor internal diameter of the socket cavity is preselected relative to the major outside diameter of the shank 12 so that the fins 28 will provide predetermined interference engagement with the external surface of shank 12 whereby the quarter panel extension 4 can be supported on the quarter panel 3 by forced insertion of the shanks 12 of studs 10 into the socket cavities 27 of the stud retainers 20 previously fixed to the quarter panel, in the manner described above. That is, the minor diameter of a socket cavity 27 is slightly less, by a predetermined amount, than the major diameter of the shank 12. The fins 28 should be of suitable thickness to provide rigidity while still permitting insertion of the shank 12 into the socket cavity.

The minor diameter of the shank 12, that is the outside diameter at the bottom of the retention grooves 15 is suitably less than the normal minor diameter of the socket cavity 27 for a purpose which will become apparent.

With the fastener assembly thus far described, during assembly of the vehicle body 2, for example, and prior to painting of it, the stud retainers 20 are first inserted and pushed into the apertures 8 of the quarter panel 3 until they are frictionally secured to the quarter panel 3. The quarter panel extension 4 is then attached to the quarter panel 3 by pushing the studs 10, which have previously been secured to the quarter panel extension, into the socket cavities 27 of the stud retainers 20. The interference fit of the interior edges 30 of the fins 28 of a stud retainer 20 against the outer, major peripheral surface of the shank 12 of the stud 10 associated with that stud retainer 20, is sufficient to retain the quarter panel extension 4 securely on the quarter panel 3 without generating any stresses at the fastener assembly attachment of these elements.

The vehicle body 2 with the quarter panel extension 4 initially secured to the quarter panel 3, as described above, can then be conventionally painted and conveyed through a high temperature paint oven, as is conventional in the manufacture of vehicle bodies.

After the vehicle body has gone through the paint oven, the fastening assembly can then be completed by applying a nut 40 to each of the stud retainers. If not already done, at this stage of assembly, the quarter panel extension 4 is moved in a direction, to the left with reference to FIGS. 1 and 2, to bring the end surface 4a of the extension 4 into abutment against the end surface 3a of the quarter panel 3, as shown in FIG. 2. As this movement is made, the shank 12 of the stud 10 is forced into full engagement within the socket cavity 27 of its associated stud retainer 20 and at the same time the stud retainer 20 may be forced axially through the aperture 8, into which it had inserted, to a position at which its bearing flange 24 abuts against the surface 3a or against the sealant material 9 sandwiched therebetween, if not already pre-assembled in this position.

The nut 40, which may be any type conventional metal nut with an internally threaded bore 41 of a suitable size corresponding to the outside diameter of the crown portion 21 of the stud retainer 20, is then threaded down onto the crown portion 21 of the stud retainer 20 until it abuts against the opposite surface 3b of quarter panel 3 from surface 3a. As the nut 40 is threaded onto the crown portion 21 it will, in effect, roll form mating external threads thereon, forcing the plastic material of the stud retainer to flow radially inward into the annular grooves 15 on the shank 12 of the stud 10, thereby entrapping this portion of the stud in the stud retainer whereby to prevent axial movement of the stud 10 relative to the stud retainer 20.

As will be apparent from the construction shown in FIG. 2, the nut 40 does not act directly upon the stud 10 but, in effect, "crushes" the crown portion 21, including the fins 28, of the stud retainer around it. It will be apparent from FIG. 2, that except for the crown portion 21 encircled by nut 40, the material of the crown portion 21, including fins 28, does not extend fully into the retention grooves 15 where the shank 12 is only in interference engagement, although for purpose of illustrating this interference fit, portions of the fins 28 are illustrated as partly extending into these retention grooves 15. It will now be apparent to those skilled in the art, that the minor diameter of the shank 12 is less than the normal, minor internal diameter of the socket cavity 27 by a predetermined amount so as to provide sufficient space in the retention grooves 15 to accommodate the material of the stud retainer 20 as the nut 40 is threaded thereon.

In the embodiment shown, in FIG. 2 rotation of the stud retainer 20 in the aperture 8 of the quarter panel 3 as the nut 40 is threaded thereon is prevented by a coating of a suitable adhesive material, not shown, applied to the sealant material 9, if the latter itself is not adhesive, so that the flange 24 of the stud retainer is, in effect, secured to the quarter panel 3 by this adhesive material. Alternately, as is well known in the art, with particular reference to snap-in type fasteners, the exterior shape of the crown portion 21 next adjacent to the boss 31 and/or the boss 31 may be formed of any non-circular configuration, as desired, so as to snap into a complimentary shaped aperture 8 in the quarter panel 3, whereby to prevent rotation of the stud retainer 20 relative to the quarter panel 3.

Figure 3:
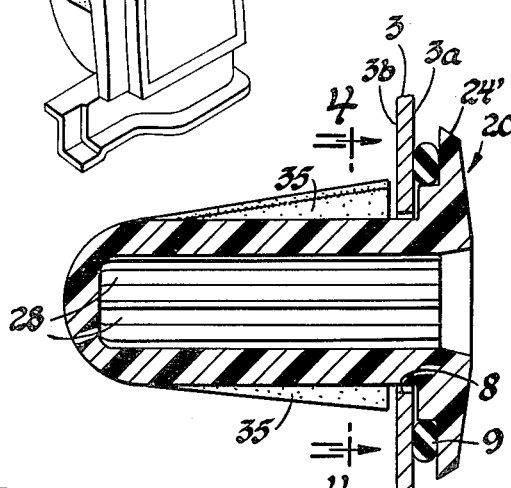
FIG. 3 is a sectional view of an alternate embodiment plastic plug for use in the subject assembly.
Figure 4:
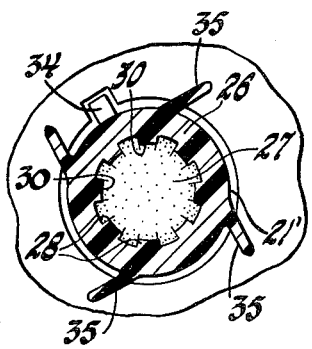
FIG. 4 is an enlarged sectional view of the plastic plug of FIG. 3 taken along line 4—4 of FIG. 3.

Thus in the alternate embodiment of the stud retainer 20' shown in FIGS. 3 and 4, wherein similar parts are designated by similar numerals but with the addition of a prime (') where appropriate, the crown portion 21' of this retainer has an antirotation key 34, extending radially outward therefrom next adjacent to the bearing flange 24' of the stud retainer, which is adapted to cooperate with a corresponding shaped key notch or slot, as at 8a, provided as part of the aperture 8' through the rear quarter panel 3.

In addition, the crown portion 21' of this stud retainer 20' is provided with a plurality of circumferentially spaced apart tapered retaining wings or arms 35 that extend radially outward, preferably at an inclined angle from the main body portion of crown portion 21'. As shown in FIG. 3, the upper extremities of the wings or arms 35 adjacent the bearing flange 24' are relatively thick in a transverse or radial direction and taper down in thickness toward the closed end of the crown portion 21'. During insertion of the crown portion 21' through the aperture 8' in the rear quarter panel 3, the wings or arms 35 will flex inward until the undersurface of flange 24' comes into contact with the surface 3a at which time the wings or arms 35 flex outward to underlie the opposite surface 3b of rear quarter panel 3, their position shown in FIG. 3, whereby the stud retainer 20' is positively retained on the rear quarter panel to permit insertion of the shank portion 12 of a stud 10 therein. Of course during final assembly, when the nut 40 is threaded onto the crown portion 21', these wings or arm 35 will again deflect radially inward but then positive retention is effected by the retaining nut 40 as it abuts against the surface 3b with the rear quarter panel sandwiched between the nut 40 and the bearing flange 24'. It should be realized that the outside diameter of the crown portion 21', with the wings or arms 35 folded thereagainst, will be sized relative to the retaining nut 40 used therewith so that a stud 10 can be secured thereto in the manner previously described relative to stud retainer 20.

It will thus be apparent that whether the stud retainer 20 or the stud retainer 20' is used, that when the nut 40 is threaded thereon during final assembly, any axial load applied by this nut is transmitted to the stud retainer only. This is due to the fact that the stud retainer is bottomed against the rear quarter panel 3 during insertion of the shank portion 12 of a stud 10 fixed to the quarter panel extension 4 therein and then no further axial movement of the stud retainer can occur that can transmit the load to the quarter panel extension 4.

The use of either a stud retainer 20 or 20' makes it possible to always bottom the quarter panel extension 4, as at 4a, against the surface 3a of the rear quarter panel 3 irrespective of any variation in the dimension or surface of the rear quarter panel 3 at the stud retainer 20 or 20' location thereon. This arrangement makes it possible to achieve a good positive retention of the quarter panel extension 4 to the rear quarter panel 3 without exerting any loads on the extension 4 that could result in extension 4 distortion and/or breakage thereof.

What is claimed is:

1. A fastener assembly for securing a first member to a second member having at least one aperture therethrough, said fastener assembly including a plastic push-on stud retainer having a flange head portion adapted to be in close proximity to one side of the second member and an integral axially elongated tubular wall portion, defining a hollow crown portion closed by an end wall, extending from said flange head portion and frictionally engaged in the aperture of the second member with said end wall being positioned outward from the opposite side of the second member, said crown portion providing a throat portion adjacent said flange head portion that opens into a socket cavity within said hollow crown portion and a plurality of circumferentially spaced apart longitudinal ribs extending radially inward from said tubular wall portion to define a stud receiving opening having an original, as fabricated, predetermined minor internal diameter, a stud fixed at one end to said first member, said stud having a shank with a series of annular retention grooves thereon extending outward from said first member to project into said stud receiving opening in said hollow crown portion of said push-on stud retainer, the major outside diameter of said shank being complementary to said minor internal diameter of said stud receiving opening whereby said first member is frictionally supported by said second member, and nut means having a bore therein provided with internal threads threaded onto said hollow crown portion of said push-on stud retainer whereby said internal threads cause the material of said longitudinal ribs of said hollow crown portion to flow radially inward into said annular retention grooves to lock said push-on stud retainer to said shank of said stud.

2. A fastener assembly for securing a first member to an apertured second member, said fastener assembly including a plastic push-on stud retainer, a stud and a nut means, said stud retainer having a flange head portion and an integral axially elongated tubular wall portion, defining a hollow crown portion closed by an end wall, extending from said flange head portion said crown portion being adapted to be frictionally engaged in the aperture of the second member with said end wall being positioned outward from one side of the second member and said flange head portion positioned for abutment against the opposite side of said second member, said crown portion providing a throat portion adjacent said flange head portion that opens into a socket cavity within said hollow crown portion, a plurality of circumferentially spaced apart longitudinal ribs extending radially inward from said tubular wall portion to define a stud receiving opening having an original, as fabricated, predetermined minor internal diameter, said stud being adapted to be fixed at one end to said first member, said stud having a shank with a series of annular retention grooves thereon extending outward from said first member to project into said stud receiving opening in said hollow crown portion of said push-on stud retainer, the major outside diameter of said shank being complementary to said minor internal diameter of said stud receiving opening whereby said stud fixed to said first member is frictionally supported by said stud retainer on said second member, said nut means having an internal threaded bore for threaded engagement onto said hollow crown portion of said push-on stud retainer whereby said internal threaded bore of said nut means cause the material of said longitudinal ribs of said hollow crown portion to flow radially inward into said annular retention grooves to lock said push-on stud retainer to said shank of said stud.

* * * * *